(12) United States Patent
Catovic et al.

(10) Patent No.: US 12,035,229 B2
(45) Date of Patent: Jul. 9, 2024

(54) SLICE-AWARE PLMN SELECTION

(71) Applicant: QUALCOMM Incorporated, San Diego, CA (US)

(72) Inventors: Amer Catovic, San Diego, CA (US); Lenaig Genevieve Chaponniere, La Jolla, CA (US); Sitaramanjaneyulu Kanamarlapudi, San Diego, CA (US); Prasad Reddy Kadiri, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/195,452

(22) Filed: Mar. 8, 2021

(65) Prior Publication Data

US 2021/0282084 A1    Sep. 9, 2021

Related U.S. Application Data

(60) Provisional application No. 62/987,106, filed on Mar. 9, 2020.

(51) Int. Cl.
*H04W 48/18* (2009.01)
*H04W 8/26* (2009.01)
(Continued)

(52) U.S. Cl.
CPC ............ *H04W 48/18* (2013.01); *H04W 8/26* (2013.01); *H04W 60/06* (2013.01); *H04W 84/042* (2013.01)

(58) Field of Classification Search
CPC ....... H04W 48/18; H04W 8/26; H04W 60/06; H04W 84/042
See application file for complete search history.

(56) References Cited

U.S. PATENT DOCUMENTS

2017/0332287 A1* 11/2017 Sethi ................. H04W 36/0022
2018/0270744 A1    9/2018 Griot et al.
(Continued)

FOREIGN PATENT DOCUMENTS

CN    106982458 A    7/2017
WO   2018199611 A1   11/2018

OTHER PUBLICATIONS

3GPP: "3rd Generation Partnership Project; Technical Specification Group Core Network and Terminals; Non-Access-Stratum (NAS) Protocol, for 5G System (5GS); Stage 3 (Release 16)", 3GPP Standard; Technical Specification; 3GPP TS 24.501, 3rd Generation Partnership Project (3GPP), Mobile Competence Centre; 650, Route Des Lucioles; F-06921 Sophia-Antipolis Cedex; France vol. CT WG1, No. V16.3.0, Dec. 20, 2019 (Dec. 20, 2019), pp. 1-645, XP051840838, 24501-g30.doc, [retrieved on Dec. 20, 2019] 4.5.2, 6.2.8, 6.2.10, p. 207-221, 333-334, 518-520.

(Continued)

*Primary Examiner* — Wayne H Cai
(74) *Attorney, Agent, or Firm* — QUALCOMM Incorporated

(57) ABSTRACT

Certain aspects of the present disclosure provide techniques for slice-aware network selection. Particular aspects provide for a method for wireless communication performed by a user equipment (UE). The method generally includes obtaining, for one or more networks, network slicing information indicating one or more slice identifiers supported in the one or more networks, deriving a list of one or more preferred networks based, at least in part, on the network slicing information, and selecting a network to register with from the list of one or more preferred networks.

30 Claims, 16 Drawing Sheets

(51) Int. Cl.
 *H04W 60/06* (2009.01)
 *H04W 84/04* (2009.01)

(56) References Cited

U.S. PATENT DOCUMENTS

| | | | |
|---|---|---|---|
| 2019/0029065 A1 | 1/2019 | Park et al. | |
| 2019/0159101 A1* | 5/2019 | Yu | H04W 36/32 |
| 2019/0357129 A1 | 11/2019 | Park et al. | |
| 2020/0137675 A1* | 4/2020 | Park | H04W 68/005 |
| 2021/0112513 A1 | 4/2021 | Chun | |
| 2021/0204206 A1* | 7/2021 | Kim | H04W 88/10 |

OTHER PUBLICATIONS

Partial International Search Report—PCT/US2021/021554—ISA/EPO—Jun. 14, 2021.
International Search Report and Written Opinion—PCT/US2021/021554—ISA/EPO—Sep. 13, 2021.

* cited by examiner

| Initial NAS message | NSSAI inclusion mode A | NSSAI inclusion mode B | NSSAI inclusion mode C | NSSAI inclusion mode D |
|---|---|---|---|---|
| REGISTRATION REQUEST message: i) including the 5GS registration type IE set to "initial registration" | Requested NSSAI | Requested NSSAI | Requested NSSAI | No NSSAI |
| REGISTRATION REQUEST message: i) including the 5GS registration type IE set to "mobility registration updating"; and ii) initiated by case other than case g) or n) in subclause 5.5.1.3.2 | Requested NSSAI | Requested NSSAI | Requested NSSAI | No NSSAI |
| REGISTRATION REQUEST message: i) including the 5GS registration type IE set to "mobility registration updating"; and ii) initiated by case g) or n) in subclause 5.5.1.3.2 | Allowed NSSAI | Allowed NSSAI | No NSSAI | No NSSAI |
| REGISTRATION REQUEST message: i) including the 5GS registration type IE set to "periodic registration updating" | Allowed NSSAI | Allowed NSSAI | No NSSAI | No NSSAI |
| SERVICE REQUEST message | Allowed NSSAI | See NOTE 1 | No NSSAI | No NSSAI |

NOTE 1: All the S-NSSAIs of the PDU sessions that have the user-plane resources requested to be re-established by the service request procedure or the S-NSSAIs of a control plane interaction triggering the service request is related to (see 3GPP TS 23.501 [8])

NOTE 2: For a REGISTRATION REQUEST message including the 5GS registration type IE set to "emergency registration", a DEREGISTRATION REQUEST message and a SERVICE REQUEST message including the service type IE set to "emergency services" or "emergency services fallback", no NSSAI is provided to the lower layers.

NOTE 3: The mapped configured S-NSSAI(s) from the S-NSSAI(s) of the HPLMN are not included as part of the S-NSSAIs in the requested NSSAI or the allowed NSSAI when it is provided to the lower layers.

FIG. 6

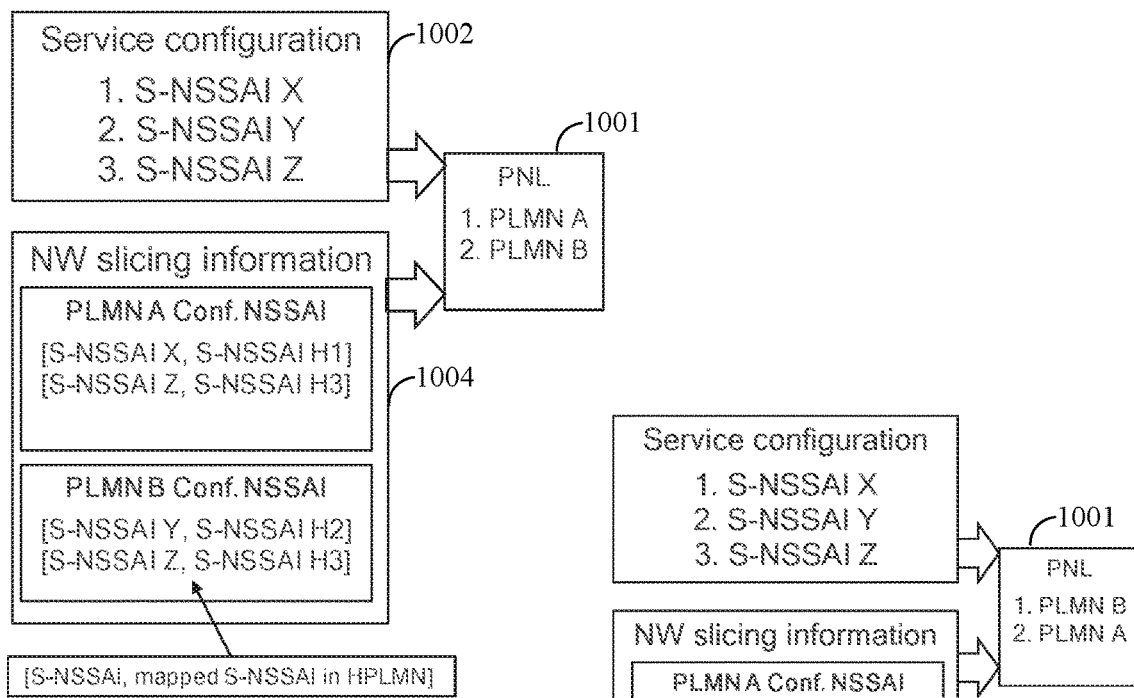
FIG. 10A
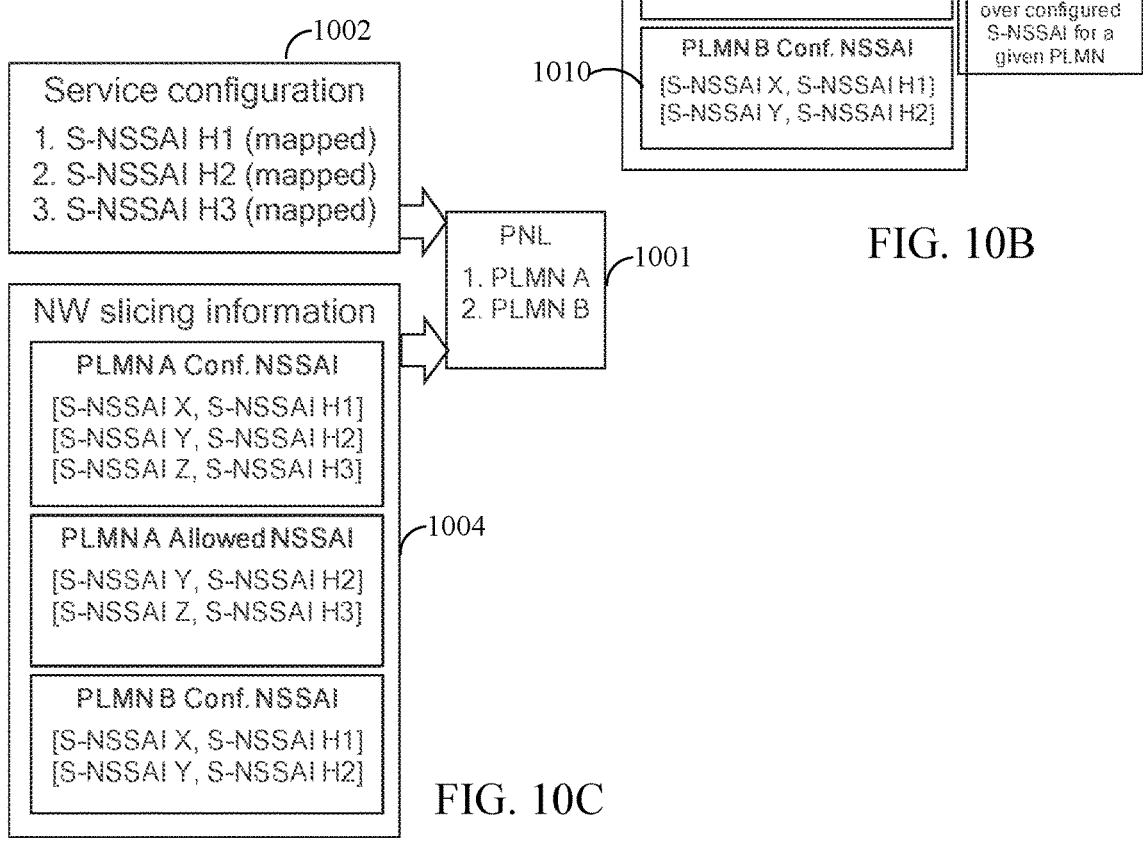
FIG. 10B
FIG. 10C the section entitled "Detailed Description" one will understand how the features of this disclosure provide advantages that include improved network slice selection assistance information (NSSAI) signaling.

SLICE-AWARE PLMN SELECTION

CROSS-REFERENCE TO RELATED APPLICATIONS

This application claims benefit of and priority to U.S. Provisional Application No. 62/987,106, filed Mar. 9, 2020, which is assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for selecting a network based, at least in part, on services offered.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved network slice selection assistance information (NSSAI) signaling.

Certain aspects can be implemented in a method for wireless communication by a user equipment (UE). The method generally includes obtaining, for one or more networks, network slicing information indicating one or more slice identifiers supported in the one or more networks, deriving a list of one or more preferred networks based, at least in part, on the network slicing information, and selecting a network to register with from the list of one or more preferred networks.

Certain aspects can be implemented in an apparatus for wireless communication by a user equipment (UE). The apparatus may include a processing system, comprising: a memory comprising computer-executable instructions and one or more processors configured to execute the computer-executable instructions and cause the processing system to: obtain, for one or more networks, network slicing information indicating one or more slice identifiers supported in the one or more networks, derive a list of one or more preferred networks based, at least in part, on the network slicing information, and select a network to register with from the list of one or more preferred networks.

Certain aspects can be implemented in an apparatus for wireless communication by a user equipment (UE). The apparatus may include means for obtaining, for one or more networks, network slicing information indicating one or more slice identifiers supported in the one or more networks, means for deriving a list of one or more preferred networks based, at least in part, on the network slicing information, and means for selecting a network to register with from the list of one or more preferred networks.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: obtain, for one or more networks, network slicing information indicating one or more slice identifiers supported in the one or more networks, derive a list of one or more preferred networks based, at least in part, on the network slicing information, and select a network to register with from the list of one or more preferred networks.

Certain aspects can be implemented in a computer program product for wireless communication by a user equipment (UE) embodied on a computer-readable storage medium. The computer-readable storage medium may comprise code for obtaining, for one or more networks, network slicing information indicating one or more slice identifiers supported in the one or more networks, deriving a list of one or more preferred networks based, at least in part, on the network slicing information, and selecting a network to register with from the list of one or more preferred networks.

Certain aspects can be implemented in a method for wireless communication by a user equipment (UE). The method generally includes sending a registration request for a new service to the first network, receiving a registration response from the first network comprising an indication that the new service is not supported in the first network, and initiating de-registration with the first network based on the registration response.

Certain aspects can be implemented in an apparatus for wireless communication by a user equipment (UE). The apparatus may include a processing system, comprising: a memory comprising computer-executable instructions and one or more processors configured to execute the computer-executable instructions and cause the processing system to: send a registration request for a new service to the first network, receive a registration response from the first network comprising an indication that the new service is not supported in the first network, and initiate de-registration with the first network based on the registration response.

Certain aspects can be implemented in an apparatus for wireless communication by a user equipment (UE). The apparatus may include means for sending a registration request for a new service to the first network, means for receiving a registration response from the first network comprising an indication that the new service is not supported in the first network, and means for initiating de-registration with the first network based on the registration response.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: send a registration request for a new service to the first network, receive a registration response from the first network comprising an indication that the new service is not supported in the first network, and initiate de-registration with the first network based on the registration response.

Certain aspects can be implemented in a computer program product for wireless communication by a user equipment (UE) embodied on a computer-readable storage medium. The computer-readable storage medium may comprise code for sending a registration request for a new service to the first network, receiving a registration response from the first network comprising an indication that the new service is not supported in the first network, and initiating de-registration with the first network based on the registration response.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a table showing example NSSAI inclusion modes.

FIGS. 10A-10C illustrate examples of preferred network lists, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
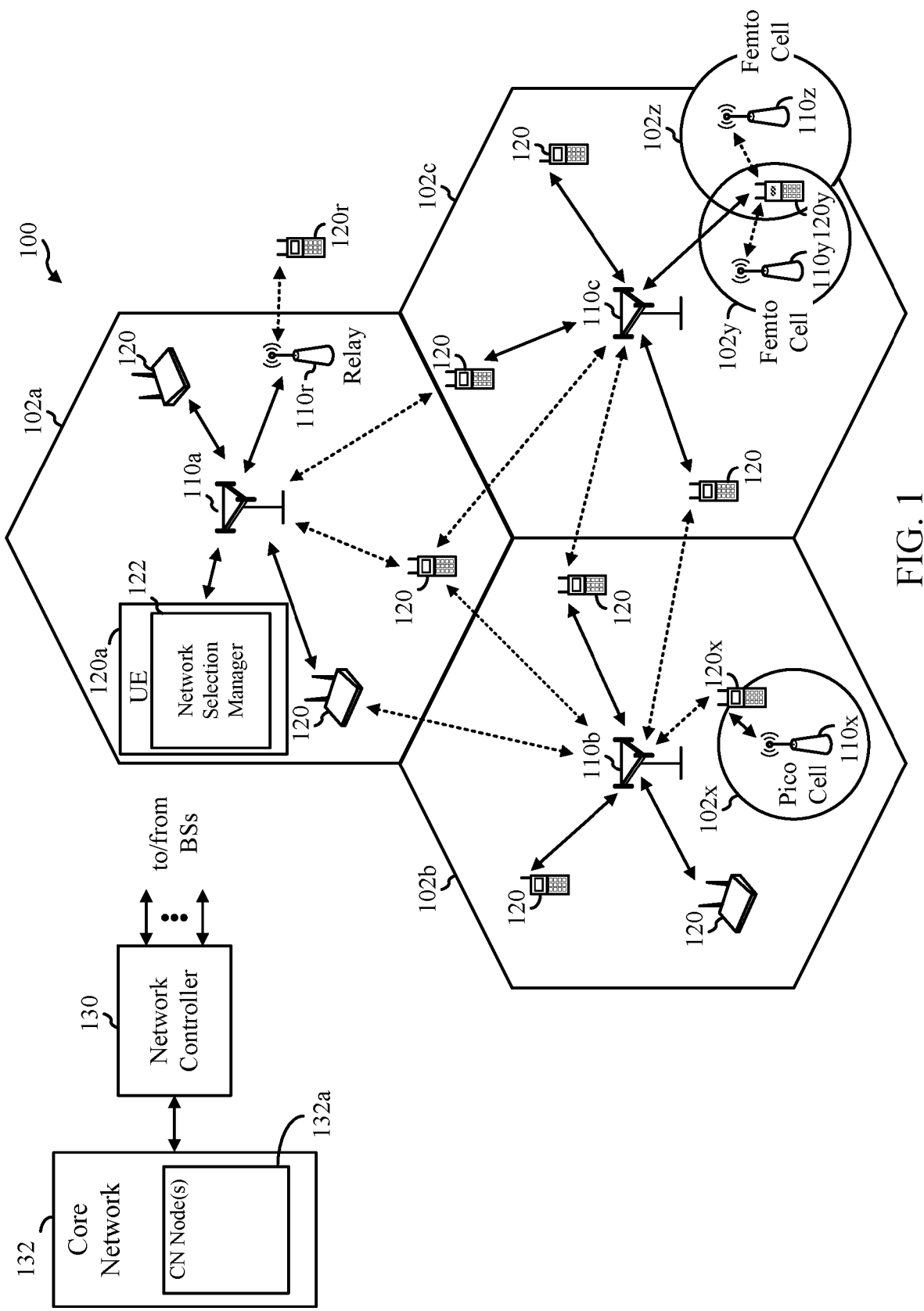
FIG. 1 is a block diagram conceptually illustrating an example telecommunications system, in accordance with certain aspects of the present disclosure.

Aspects of the present disclosure provide apparatus, methods, processing systems, and computer readable mediums for slice-aware network selection. As will be described in greater detail below, a preferred network list (PNL) may be derived based on desired services and services supported at available networks.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems, including later technologies.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, one or more UEs 120, such as the UE 120a, may include a network selection manager 122. The network selection manager 122 may be configured to perform the operations 800 of FIG. 8 and/or operations 1500 of FIG. 15, as well as other operations disclosed herein for performing the various techniques discussed herein for performing slice-aware network selection and/or performing UE-initiated de-registration.

For example, the wireless communication network 100 may be an NR system (e.g., a 5G NR network). As shown in FIG. 1, the wireless communication network 100 may be in communication with a core network 132. The core network 132 may in communication with one or more BSs 110 and/or UEs 120 via one or more interfaces as discussed more detail below with respect to FIG. 3.

As illustrated in FIG. 1, the wireless communication network 100 may include a number of base stations (BSs)

110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The wireless communication network 100 may be in communication with the CN 132, which includes one or more CN nodes 132a. A network controller 130 may couple to a set of BSs 110 and provide coordination and control for these BSs 110. The network controller 130 may communicate with the BSs 110 via a backhaul. The network controller 130 may also couple to one or more of the CN nodes 132a.

Figure 2:
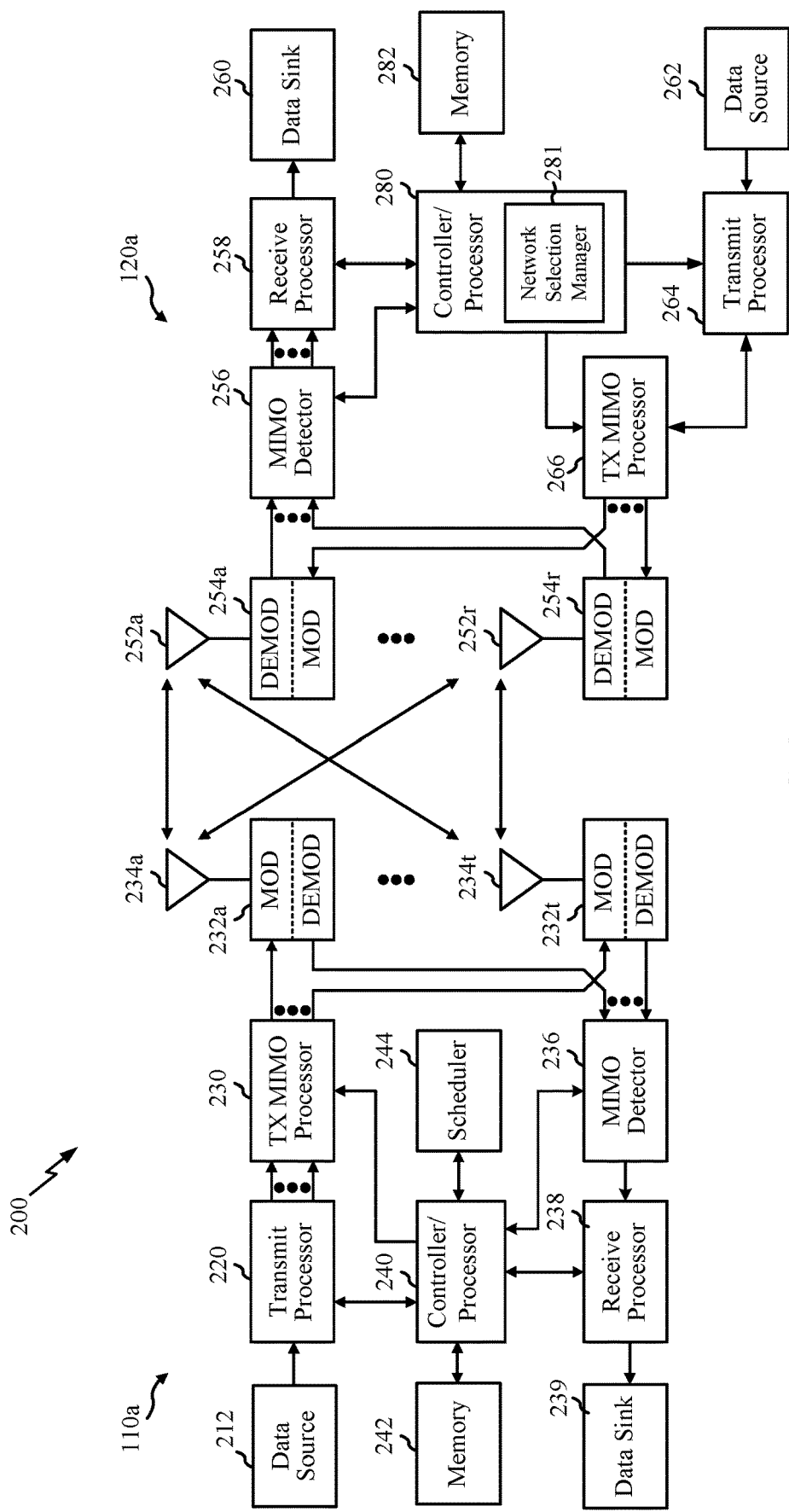
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a may be used to perform the various techniques and methods described herein. For example, as shown in FIG. 2, the controller/processor 280 of the UE 120a includes an network selection manager 281 that may be configured to perform the operations illustrated in FIG. 8 and/or FIG. 15, as well as other operations described herein for performing the various techniques discussed herein for performing slice-aware network selection and/or performing UE-initiated de-registration. Although shown at the controller/processor, other components of the UE 120a and BS 110 may be used to perform the operations described herein.

Figure 3:
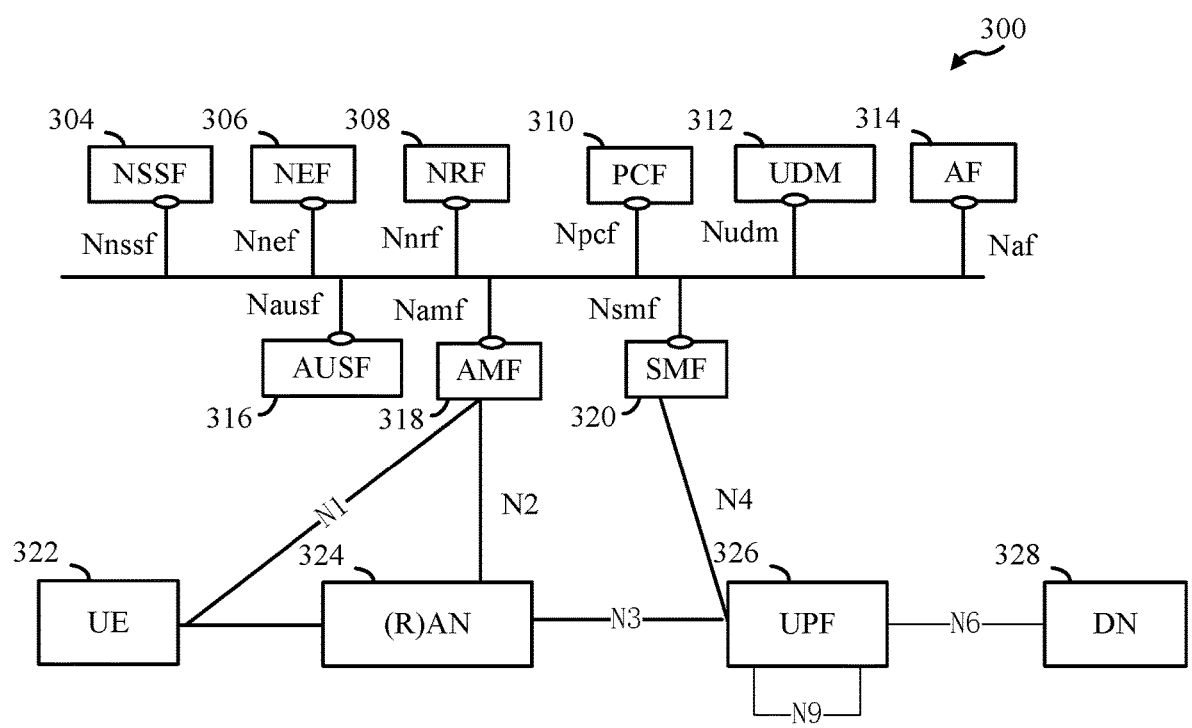
FIG. 3 is a block diagram illustrating an example architecture of a core network (CN) and radio access network (RAN), in accordance with certain aspects of the present disclosure.

FIG. 3 is a block diagram illustrating an example architecture of a core network (CN) 300 (e.g., such as the CN 132 in FIG. 1) in communication with a RAN 324, in accordance with certain aspects of the present disclosure. As shown in FIG. 3, the example architecture includes the CN 300, RAN 324, UE 322, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, Access and Mobility Management Function (AMF) 318, Session Management Function (SMF) 320; User Plane Function (UPF) 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 322 and SMF 320; transparent proxy for routing SM messages; access authentication; access authorization; transport for short message service (SMS) messages between UE 322 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 322 and a location management function (LMF) as well as between RAN 324 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances. NSSF may support: selecting of the Network Slice instances to serve the UE 322, determining the allowed network slice selection assistance information (NSSAI), and/or determining the AMF set to be used to serve the UE 322.

NEF 306 may support: exposure of capabilities and events, secure provision of information from external application to 3GPP network, translation of internal/external information. AF 314 may support: application influence on traffic routing, accessing NEF 306, and/or interaction with policy framework for policy control.

As shown in FIG. 3, the CN 300 may be in communication with the AS 302, UE 322, RAN 324, and DN 328. In some examples, the CN 300 communicates with the external AS 302 via the NEF 306 and/or AF 314. In some examples, the CN 300 communicates with the RAN 324 (e.g., such as the BS 110a in the wireless communication network 100 illustrated in FIG. 1) and/or the UE 322 (e.g., such as the UE 120a in the wireless communication network 100 illustrated in FIG. 1) via the AMF 318.

The NSSF 304 supports the following functionality: selecting of the network slice instances to serve the UE 322; determining the allowed network slice selection assistance information (NSSAI); and/or determining the AMF set to be used to serve the UE 322.

As mentioned above, aspects of the present disclosure relate to network slice selection assistance information (NSSAI) signaling. A network slice may be defined as a logical network that provides specific network capabilities and network characteristics. A network slice instance may be defined as a set of network function instances and the required resources (e.g., compute, storage, and networking resources) which form a deployed network slice.

A network slice is identified by single network slice selection assistance information (S-NSSAI). NSSAI is a list of one or more S-NSSAIs. An S-NSSAI includes a slice/service type (SST), which refers to the expected network slice behavior (e.g., features and services), and a slice differentiator (SD), which is optional information that complements the SST(s) to differentiate amongst multiple network slices of the same SST. An S-NSSAI can have standard values (e.g., including an SST with a standardized SST value and no SD) or non-standard values (e.g., including an SST and an SD or including an SST without a standardized SST value and no SD). An S-NSSAI with a non-standard value identifies a single network slice within the PLMN with which it is associated. An S-NSSAI with a non-standard value may not be used by the UE in access stratum procedures in any PLMN other than the one to which the S-NSSAI is associated.

Network slices may differ with respects to supported features and network functions optimizations. For example, different S-NSSAIs may have different SSTs. An operator can deploy multiple network slice instances delivering the same features, but for different groups of UEs (e.g., dedicated to a customer different S-NSSAIs with the same SST but different SDs). The network may serve a single UE with one or more network slice instances simultaneously (e.g., via the 5G-AN). In some examples, a UE may be associated with up to eight different S-NSSAIs in total.

AMF instances can be common to network slice instances serving a UE. Selection of the set of network slice instances for a UE is triggered by the first contacted AMF in a registration procedure normally by interacting with the NSSF. A PDU session may belong to one specific network slice instance per PLMN. Different network slice instances may not share a protocol data unit (PDU) session, though different slices may have slice-specific PDU sessions using the same data network name (DNN). In order to enable PDU transmission in a network slice, the UE may request establishment of a PDU session in a network slice towards a DN associated with an S-NSSAI and a (DNN if there is no established PDU session adequate for the PDU transmission. The S-NSSAI included is part of allowed NSSAI of the serving PLMN, which is an S-NSSAI value valid in the serving PLMN, and in roaming scenarios the mapped S-NSSAI is also included for the PDU session if available.

Figure 4:
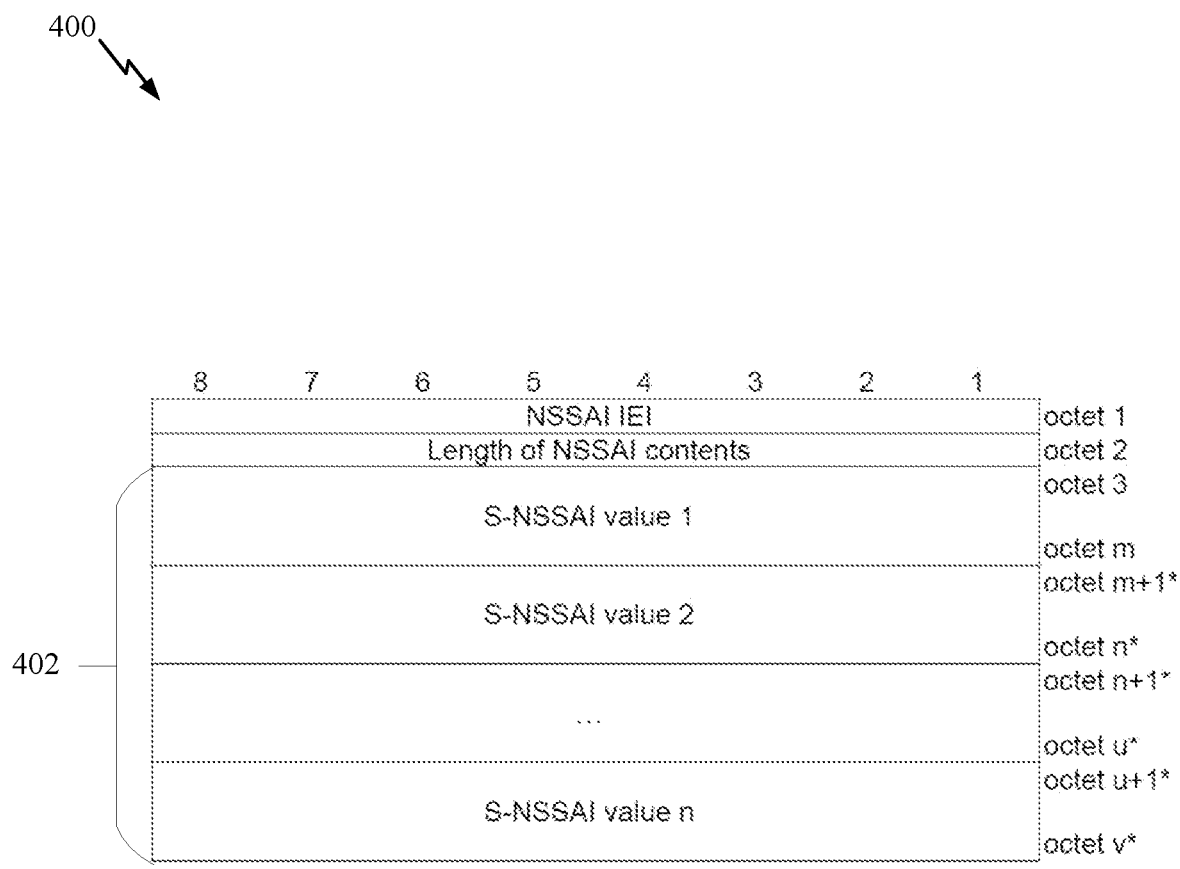
FIG. 4 is an example format of a network slice selection assistance information (NSSAI) information element (IE).

In certain systems, S-NSSAI values are provided in an NSSAI information element (IE). The NSSAI IE identifies a collection of S-NSSAIs. FIG. 4 is an example format of the NSSAI IE 400. In some cases, the example NSSAI IE 400 shown in FIG. 4 may have a length of 4 to 146 octets. The NSSAI IE 400 may indicate up to eight S-NSSAI values 402 for requested NSSAI (sent by a UE) or an allowed NSSAI (sent by the network). The NSSAI IE may indicate up to sixteen S-NSSAI values 402 in a configured NSSAI (sent by the UE and/or the network).

Figure 5:
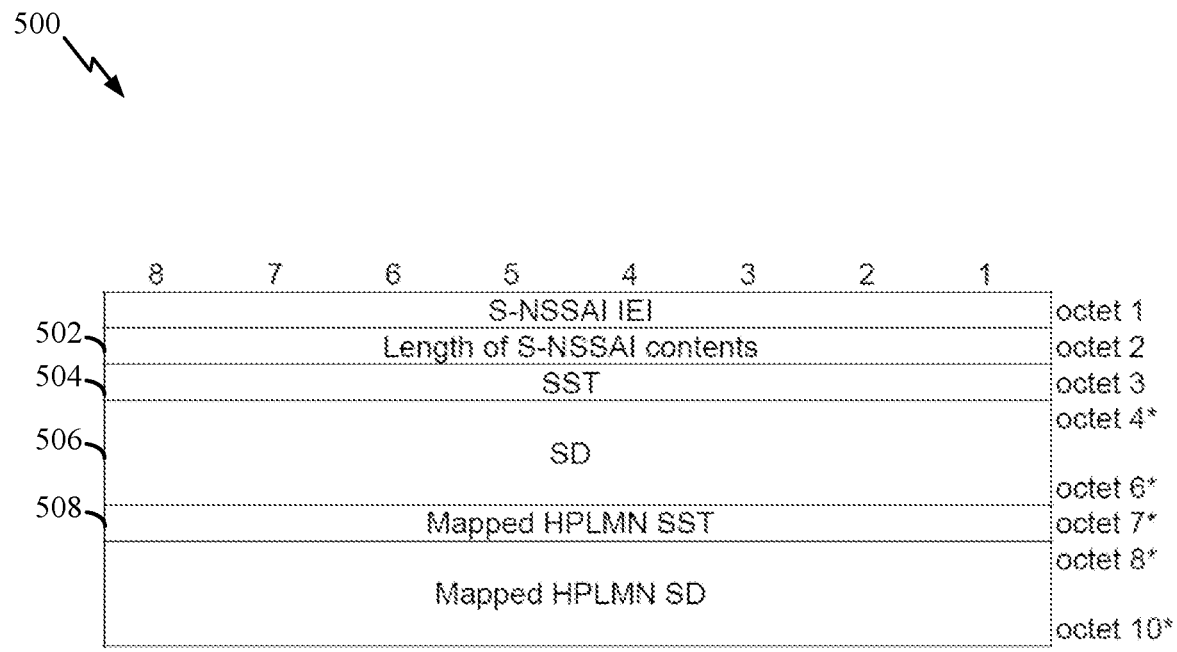
FIG. 5 is an example format of a single NSSAI (S-NSSAI) IE.

In some cases, the S-NSSAI identifies a network slice. An example format of the S-NSSAI IE 500 is shown in FIG. 5. The S-NSSAI IE 500 may have a length of 3 to 10 octets. In some cases, an S-NSSAI value may be coded as the length and value part of the example S-NSSAI IE starting with the second octet. The length of S-NSSAI field 502 may indicate the length of the included S-NSSAI contents. The S-NSSAI IE 500 may also include a one-byte (e.g., eight bit) slice/service type (SST) field 504 that may indicate an SST value. The SST value may indicate expected network slicing behavior in terms of functions and services. The S-NSSAI IE 500 may also include a three-byte slice differentiator (SD) field 506. The SD field 506 may indicate an SD value and may be used to supplement slices/service types to distinguish between multiple network slices. The S-NSSAI IE 500 may also include a mapped home public land mobile networks (HPLMN) SST field 508. The mapped HPLMN SST field 508 may indicate the SST value of an S-NSSAI in the S-NSSAI(s) of the HPLMN to which the SST value is mapped. The S-NSSAI IE 500 may also include a mapped HPLMN SD field 510. The mapped HPLMN SD field 510 may indicate the SD value of an S-NSSAI in the S-NSSAI(s) of the HPLMN to which the SST value is mapped.

In certain systems, such as 5G NR, the NSSAI IE (e.g., NSSAI 400) may be exchanged between the UE and the network as part of mobility management procedures. The NSSAI may be sent at both the non-access stratum (NAS) layer and the AS layer.

In some examples, a different NSSAIs may exist, such as a configured NSSAI, a requested NSSAI, an allowed NSSAI, and subscribed S-NSSAIs. In some cases, requested NSSAI IE can be sent in a REGISTRATION REQUEST message, except when triggered by a periodic update. As mentioned above, the requested NSSAI IE may include up to eight S-NSSAI entries, with a size of up to 74 octets.

In some examples, the allowed NSSAI IE can be sent in a REGISTRATION ACCEPT message, which may be included if the procedure is triggered by a periodic update. As mentioned above, the Allowed NSSAI IE may include up to eighth S-NSSAI entries, with a size of up to 74 octets.

In some examples, the configured NSSAI IE can be sent in a REGISTRATION ACCEPT message. As mentioned above, the Configured NSSAI IE may include up to sixteen S-NSSAI entries, with a size of up to 146 octets.

In some examples, the Allowed NSSAI IE and the Configured NSSAI IE can be sent in a CONFIGURATION UPDATE COMMAND message.

Thus, the UE NAS layer may provide the lower layers with an NSSAI (either requested NSSAI or allowed NSSAI) when the UE is in an idle mode and sends an initial NAS message.

In addition to exchanging NSSAI information at the NAS layer, the UE may be configured to send NSSAI information in the AS layer based on an NSSAI inclusion mode in which it is operating. FIG. 6 is a table 600 showing NSSAI information for different NSSAI inclusion modes and initial NAS messages. For example, as shown in table 600, when the initial NAS message comprises a registration request message that includes a 5GS registration type set to "initial registration" and the UE is operating in NSSAI inclusion mode A, the UE may be configured to send the requested NSSAI. In some cases, the network (e.g., via the AMF 318) may indicate which mode the UE operates in via a NSSAI inclusion mode IE that may be sent in the REGISTRATION ACCEPT message.

Figure 7:
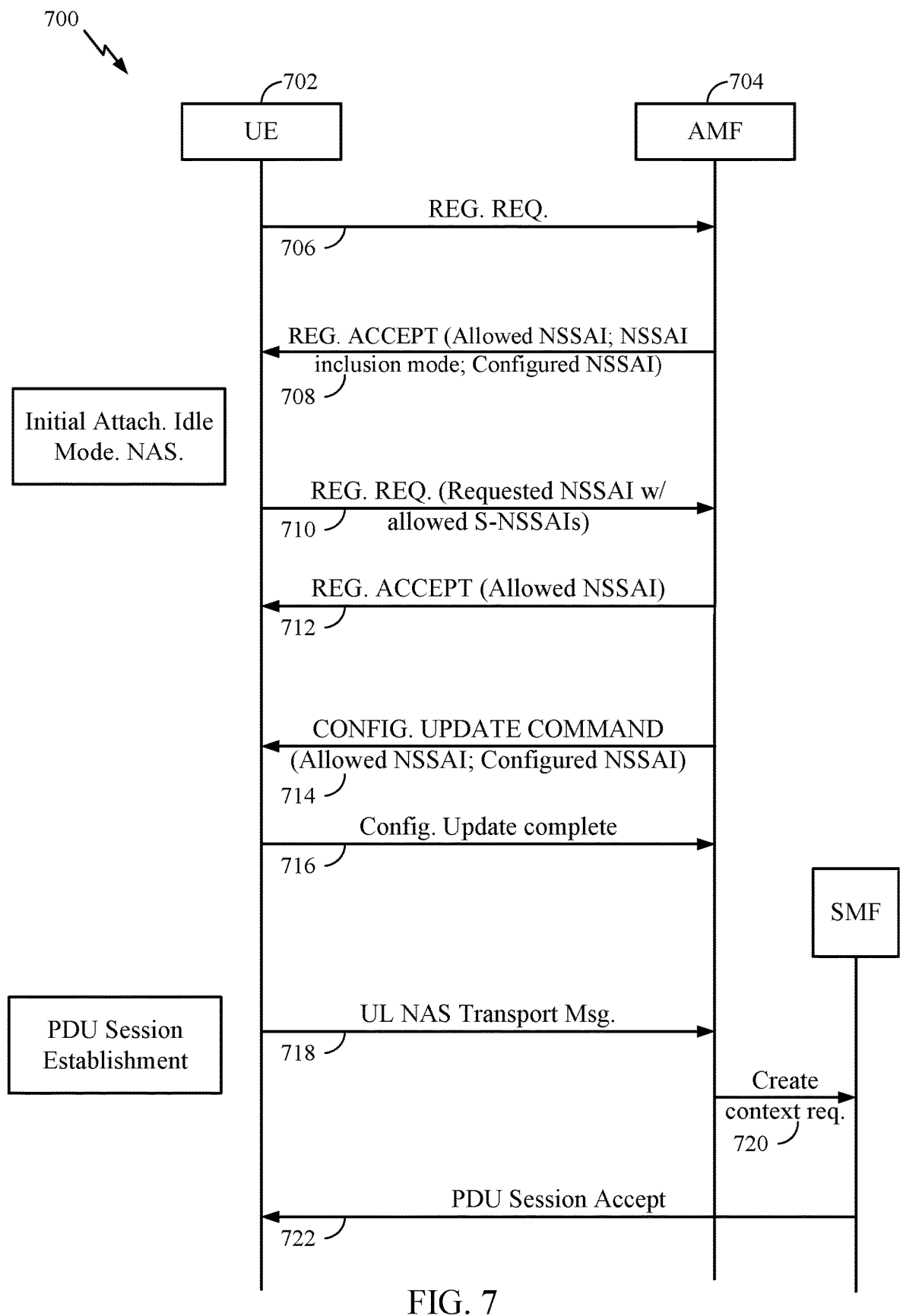
FIG. 7 is a call flow illustrating example NSSAI signaling.

FIG. 7 is a call flow 700 illustrating example NSSAI signaling. After initial registration, the UE 702 may include the requested NSSAI IE in the REGISTRATION REQUEST message to the AMF 704, except when the procedure is triggered for a periodic update. Also, the requested NSSAI IE is included in the NAS message during initial registration even if the UE already has a configured NSSAI or an allowed NSSAI from a previous registration. The requested NSSAI IE, which can be up to 74 octets long, may be considered duplicated if the UE is operating in NSSAI inclusion mode A or B for which the same information is provided via the AS layer.

As shown in FIG. 7, NSSAI signaling overhead can occur during initial attachment (e.g., such as in registration request messages 710 and registration accept messages 708, 712), during a configuration update (e.g., such as in configuration update commands 714), and/or during PDU session establishment (e.g., such as in UL NAS transport messages 718 and PDU session accept messages 722).

Thus, the NSSAI signaling may be large, involving high overhead. Further, lower layers may be configured to repeat a transmission many times, leading to further overhead, and an increase in UE power consumption. The large overhead, and increased power consumption, may be undesirable for Internet-of-Things (IoT) devices, and especially so for narrowband IoT (NB-IoT) devices.

Accordingly, what is needed are techniques and apparatus for signaling NSSAI with reduced overhead.

Example Reduced Overhead NSSAI Signaling

Aspects of the present disclosure provide apparatus, methods, processing systems, and computer readable mediums for slice-aware network selection. As will be described in greater detail below, a preferred network list (PNL) may be derived based on desired services and services supported at available networks. In some cases, the PNL may include a number of prioritized Public Land Mobile Networks (PLMNs) that may be considered when selecting a PLMN.

For example, with the proliferation of slices in the cellular networks, it may be desirable to consider services supported by available slices before selecting a network, for example, when performing selection. Aspects of the present disclosure provide an S-NSSAI-based PLMN selection procedure.

Aspects of the present disclosure may leverage mechanisms of existing 3GPP framework, for example, for mechanisms for PLMN selection, slicing mechanisms, and for combining these mechanisms to generate a new framework for S-NSSAI-aware PLMN selection.

As will be described in greater detail below, a PLMN selection procedure performed by a mobile equipment (ME), such as a UE 120a) may consider pre-configurations in a user subscriber identity module (USIM), an existing NSSAI configuration in the ME (e.g., configured NSSAI, allowed NSSAI), as well as new pre-configuration of desired/preferred services/S-NSSAIs. Such a PLMN selection procedure may provide for awareness of the support for desired S-NSSAIs in a PLMN.

Figure 8:
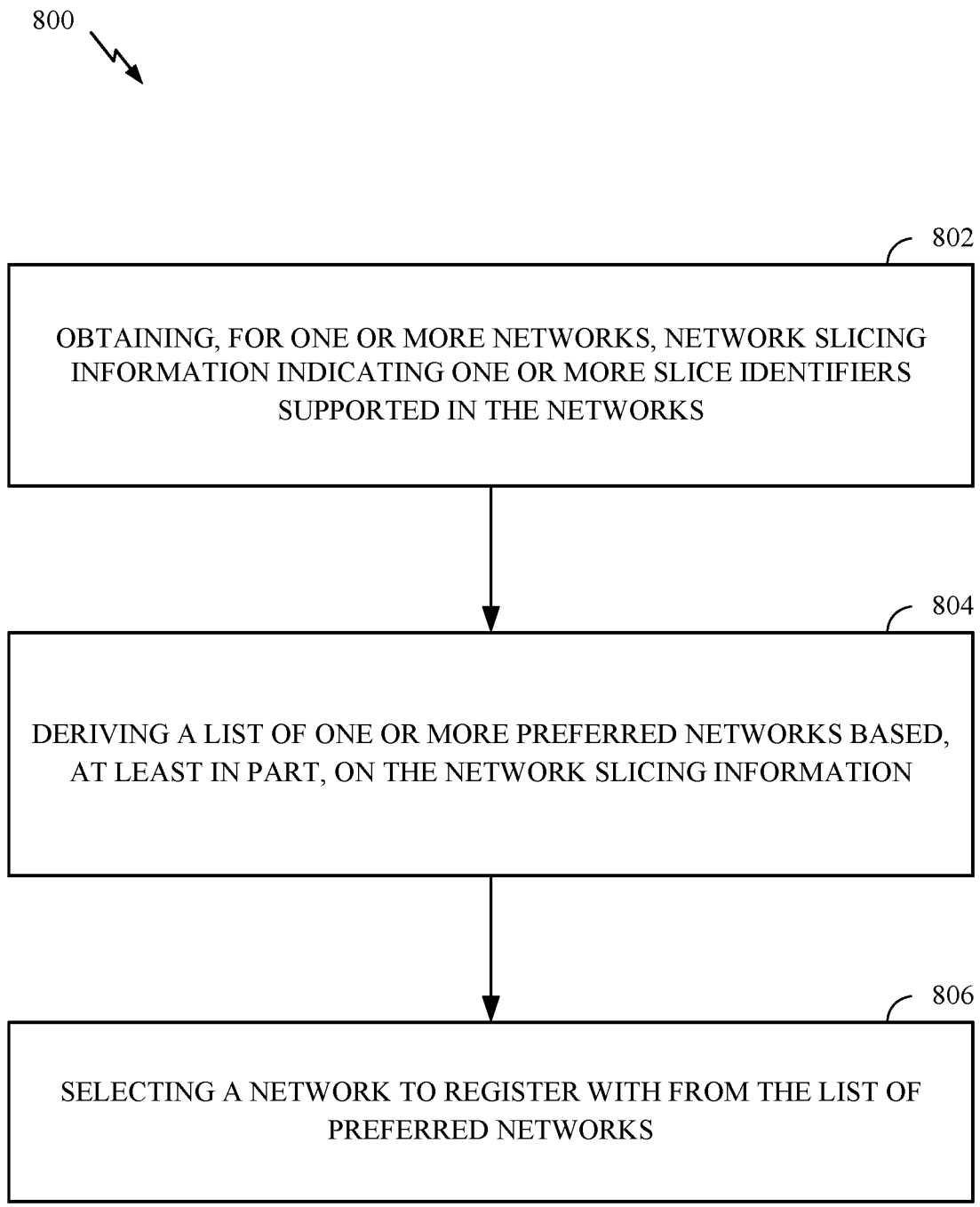
FIG. 8 illustrates example operations for slice-aware network selection by a user equipment (UE), in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100) to perform slice-aware network selection. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin, at 802, by obtaining, for one or more networks, network slicing information indicating one or more slice identifiers supported in the one or more networks.

At 804, the UE derives a list of one or more preferred networks based, at least in part, on the network slicing information.

At 806, the UE selects a network to register with from the list of one or more preferred networks.

Figure 9:
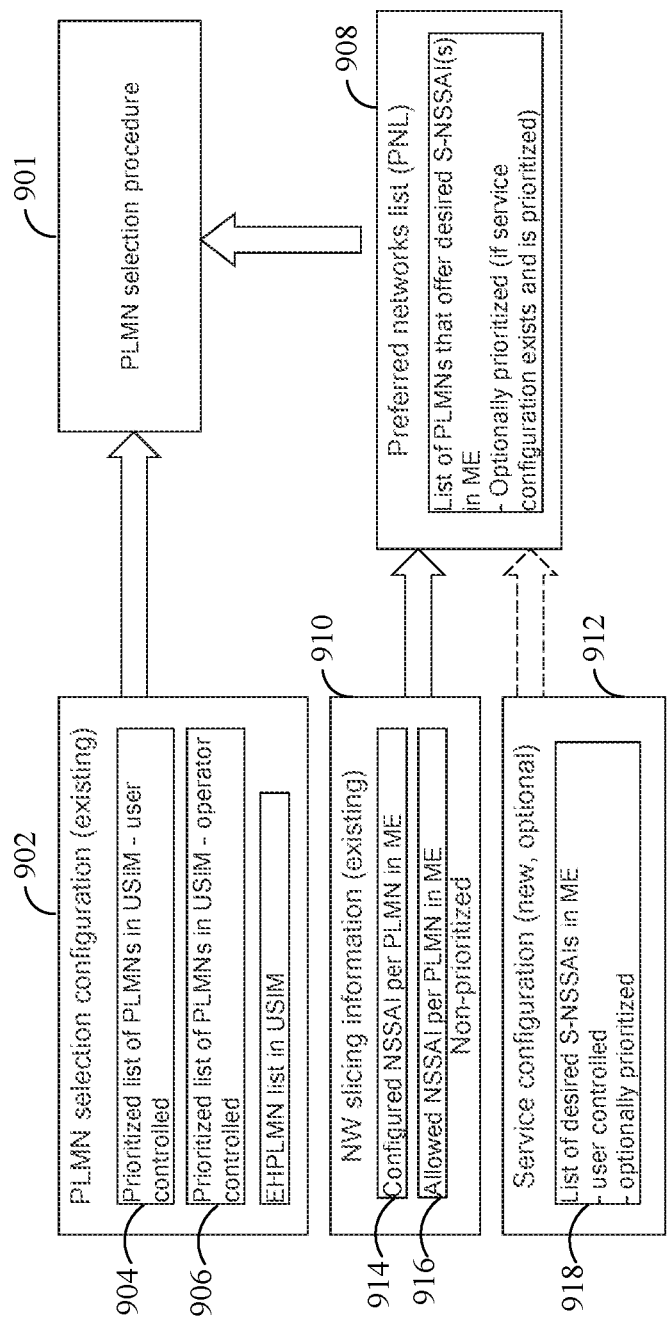
FIG. 9 illustrates an example of slice-aware network selection, in accordance with certain aspects of the present disclosure.

FIG. 9 illustrates an example of slice-aware network selection by the UE 120a, in accordance with certain aspects of the present disclosure.

As illustrated in FIG. 9, a PLMN selection procedure 901 may involve combining a PLMN selection configuration 902 that includes prioritized PLMN lists (e.g., a user controlled prioritized list of PLMNs 904 and operator controlled prioritized list of PLMNs 906) stored in the USIM with a preferred network list (PNL) 908 that includes a number of prioritized networks that offer desired S-NSSAI(S). According to aspects, the UE 120a may use the PNL to select a network to register with.

In some cases, the prioritized networks in the PNL may include networks associated with different radio access technologies (RATs), such as 5G new radio (NR) and/or a 4G long-term evolution (LTE). In some cases, the 5G NR RAT and 4G LTE RAT may be associated with different networks operated by different operators. In other cases, the 5G NR RAT and the 4G LTE RAT could be associated a network operated by the same operator and share a same PLMN entity. In this case, the 5G NR RAT and 4G LTE RAT may be considered different networks of the same operator and could each be listed separately with different priorities in the PNL. For example, in some cases, the 5G NR RAT network may have a first priority while the 4G LTE RAT may have a second priority. In other words, in some cases, the PNL may include two networks that have the same PLMN identity and use different radio access technologies (e.g., 5G RAT network and 4G LTE RAT network). In some cases, the PNL may include networks that share the same PLMN identity and the same radio access technology but use different frequencies (e.g., different operating frequencies of the 5G or 4G RATs).

As illustrated in FIG. 9, the PNL 908 may be derived based on existing NW slicing information 910 as well as service configuration information 912. The existing NW slicing information 910 may include existing configured NSSAI information 914 per PLMN and allowed NSSAI information 916 per PLMN. In some cases, the configured NSSAI information 914 per PLMN and the allowed NSSAI information 916 per PLMN may be stored in (memory of) the ME (e.g., in a non-prioritized manner as shown) (e.g., as opposed to the USIM).

The configured NSSAI information 914 generally includes a list of S-NSSAIs supported by each PLMN. Additionally, there is typically one configured NSSAI per PLMN. Further, the configured NSSAI information 914 is typically configured by the HPLMN, but it can be updated by the serving PLMN using NAS signaling.

The allowed NSSAI information 916 generally refers to a list of S-NSSAI supported by the serving PLMN. The allowed NSSAI information 916 is typically provided to the UE 120a via NAS signaling and, as shown, can be stored per PLMN.

The service configuration information 912 generally refers to a (new) list of S-NSSAIs 918 or preferred slice identifiers that the user (e.g., UE 120a) wants/desires/prefers to access. As shown in FIG. 9, this list of S-NSSAIs 918 may be derived from a list of preferred services that the user (e.g., UE 120a) wants or desires to access. In some cases, the list of S-NSSAIs 918 or preferred services may be prioritized.

In some cases, this list of S-NSSAIs 918 could be pre-configured in the UE 120a based on focused services. For example, in one embodiment, the UE 120a may be configured as voice-centric. In such cases, the UE 120a may be (pre-) configured with the highest priority given the S-NSSAIs that carry voice service. In another embodiment, the UE 120a may be corporate-owned and configured with the corporate slice as the only S-NSSAI allowed.

In some cases, the service configuration information 912 can be dynamically configured by the user. As a specific example, a user may configure the UE 120a to prioritize S-NSSAIs that carry certain preferred services (e.g., from a specific streaming content provider).

FIGS. 10A-10C illustrate various examples of how a PNL 1001 with prioritized PLMNs may be derived by the UE 120a from service configuration 1002 and NW slicing information 1004, in accordance with certain aspects of the present disclosure. Each of the examples assumes desired services, in order of priority, of S-NSSAI X, S-NSSAI Y, and S-NSSAI Z. As illustrated, there may be a mapping of service names/IDs from a VPLMN to service names/ID s in an HPLMN (e.g., a service name of "voice" in VPLMN may map to "VOIP" in HPLMN).

In the example shown in FIG. 10A, PLMN A is given highest priority in the PNL 1001, as the NW slicing information 1004 for PLMN A indicates support for both S-NSSAI X and S-NSSAI Z, while the NW slicing information for PLMN B indicates support for only S-NSSAI Y and S-NSSAI Z, but a lack of support S-NSSAI X.

As illustrated in FIG. 10B, in some cases, an allowed S-NSSAI takes precedence over configured S-NSSAI for a given PLMN. For example, in some cases, when deriving the PNL the UE 120a, the UE 120a may give higher priority to one or more networks with an allowed slice that supports a preferred service over one or more networks with a configured slice that supports the preferred service.

For example, as illustrated, the NW information 1004 in FIG. 10B may include a configured NSSAI 1006 for PLMN A, an allowed NSSAI 1008 for PLMN A, and a configured NSSAI 1010 for PLMN B. In the illustrated example, S-NSSAI X is not in the list of allowed NSSAI for PLMN A. Therefore, PLMN B is prioritized in the PNL 1001 over PLMN A in this case.

In the example of FIG. 10C, the service configuration 1002 indicates the mapped NSSAI names/IDs. In this example, as in FIG. 10A, PLMN A may be given highest priority in the PNL 1001, as the NW information 1004 for PLMN A indicates support for both S-NSSAI X and S-NSSAI Z, even though NSSAI X is not in the list of allowed NSSAI for PLMN B.

Figure 11A:
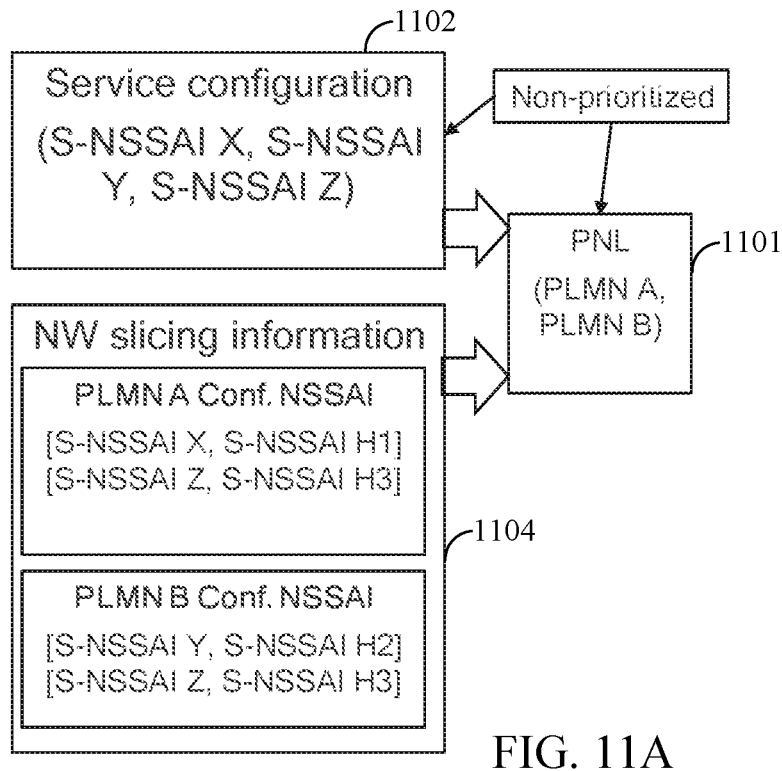
FIGS. 11A-11B illustrate examples of preferred network lists, in accordance with certain aspects of the present disclosure.
Figure 11B:
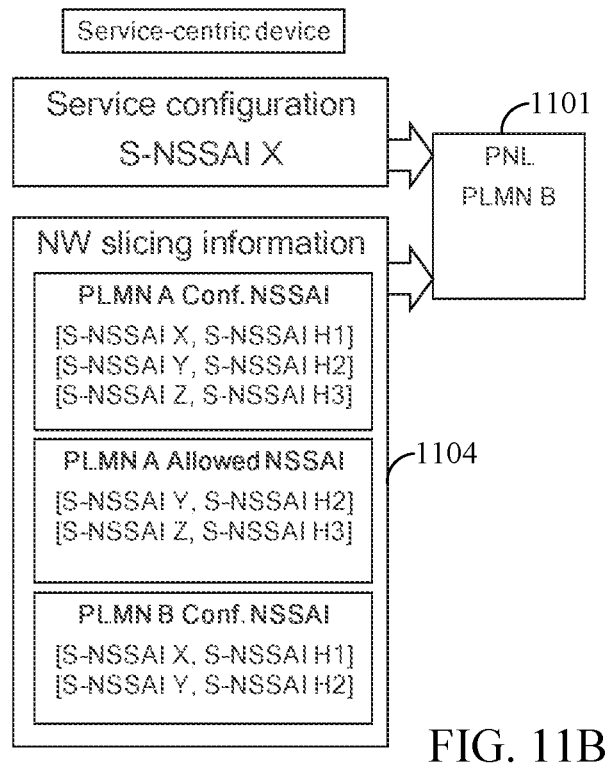

FIGS. 11A-11B illustrate various examples of how a PNL 1101 may be derived by the UE 120a with non-prioritized PLMNs. As shown, in FIG. 11A, the desired services listed in service configuration 1102 may also not be prioritized. Therefore, PLMN A and PLMN B in the network slicing information 1104 may both be listed in the PNL 1101, as they each support two of the desired services. As shown in FIG. 11B, for a service-centric device (desiring only one service), the PNL 1101 may include only the PLMN that supports that service. For example, as illustrated in FIG. 11B, the PNL 1101 may include only PLMN B from the network slicing information 1104 as PLMN B supports a desired service while PLMN A does not. In other words, when deriving the PNL 1101, the UE 120a may give priority to PLMN B as PLMN B supports the desired service while PLMN A does not.

Figure 12:
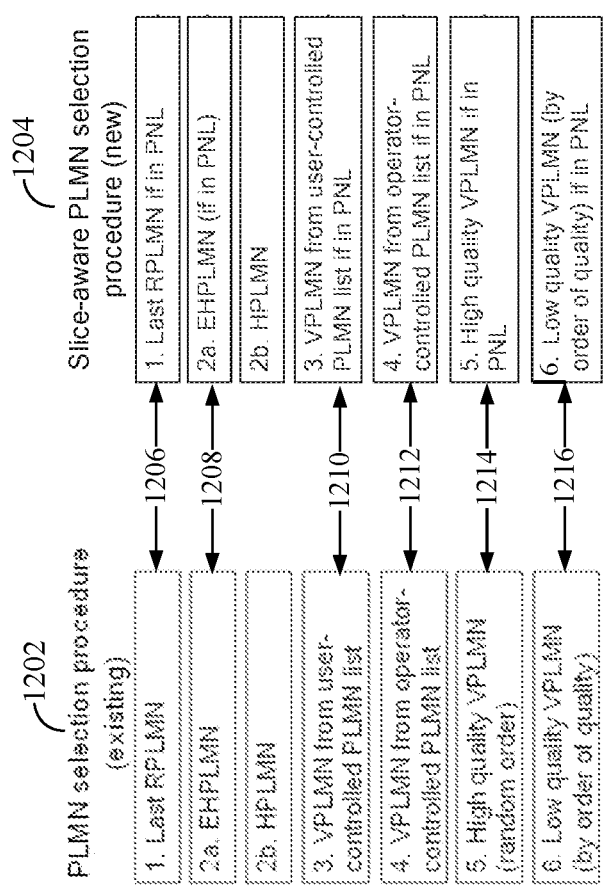
FIG. 12 illustrates a comparison between a conventional network selection to a slice-aware network selection, in accordance with certain aspects of the present disclosure.

FIG. 12 illustrates a comparison between an existing conventional network selection and slice-aware network selection, in accordance with certain aspects of the present disclosure. The existing network selection 1202 and slice-aware network selection illustrate 1204 illustrate a method for prioritizing networks (e.g., PLMNs) that the UE may consider when selecting a network to register with.

As illustrated at 1206 and 1208, similar considerations may be given between the existing network selection 1202 and the slice-aware network selection 1204 to attempt to select a last registered PLMN (RPLMN) or equivalent home (EHPLMN), except that the slice-awake network selection may include additional consideration as to whether such networks (e.g., PLMNs) are also in the PNL. In other words, in some cases, selecting the network to register with comprises selecting a last RPLMN if the RPLMN is in the PNL or an EHPLMN if the EHPLMN is in the PNL. In some cases, the UE 120a may store a list of last RPLMNs per desired S-NSSAI. In some cases, an EHPLMN may be automatically included in the PNL.

In some cases, if an RPLMN or EHPLMN are not in the PNL, the UE may select a VPLMN if the VPLMN is in the PNL. For example, as illustrated at 1210 and 1212, similar considerations may also be given between the existing network selection 1202 and the slice-aware network selection 1204 to attempt to select a VPLMN from a user-controlled or operator controlled PLMN list, except that the slice-awake network selection may include additional consideration to whether such VPLMNs are also in the PNL. Accordingly, in some cases, selecting the network to register with comprises selecting a VPLMN if the VPLMN is in the list of preferred PLMNs. In some cases, VPLMNs may be prioritized based on the PLMN list in USIM or could be prioritized based on the PNL. Additionally, in some cases, when selecting the network to register with, the UE 120a may give priority to a VPLMN from a user-controlled PLMN list over an operator-controlled PLMN list.

In some cases, VPLMNs not occurring in the user or operator controlled PLMN lists, such as the high quality VPLMN illustrated at 1214 and low quality VPLMN illustrated at 1216, could also be selected and prioritized by the UE 120a, for example, if these VPLMNs are the PNL. In some cases, VPLMNs in the PNL may be selected/prioritized based on signal quality.

In some cases, RAN assistance information may be considered for slice-aware PLMN selection by the UE 120a. In such cases, supported S-NSSAIs could be broadcast in a system information block (SIB) by the network (e.g., by a base station, such as BS 110a) and used for slice-aware PLMN selection by the UE 120a. This broadcast information may be kept more accurate/fresh than the NW slicing information configured in the UE. Additionally, to access the broadcast information, the UE need not be registered with the network, in contrast to having to be registered to receive allowed NSSAI from the network via NAS signaling.

Figure 13:
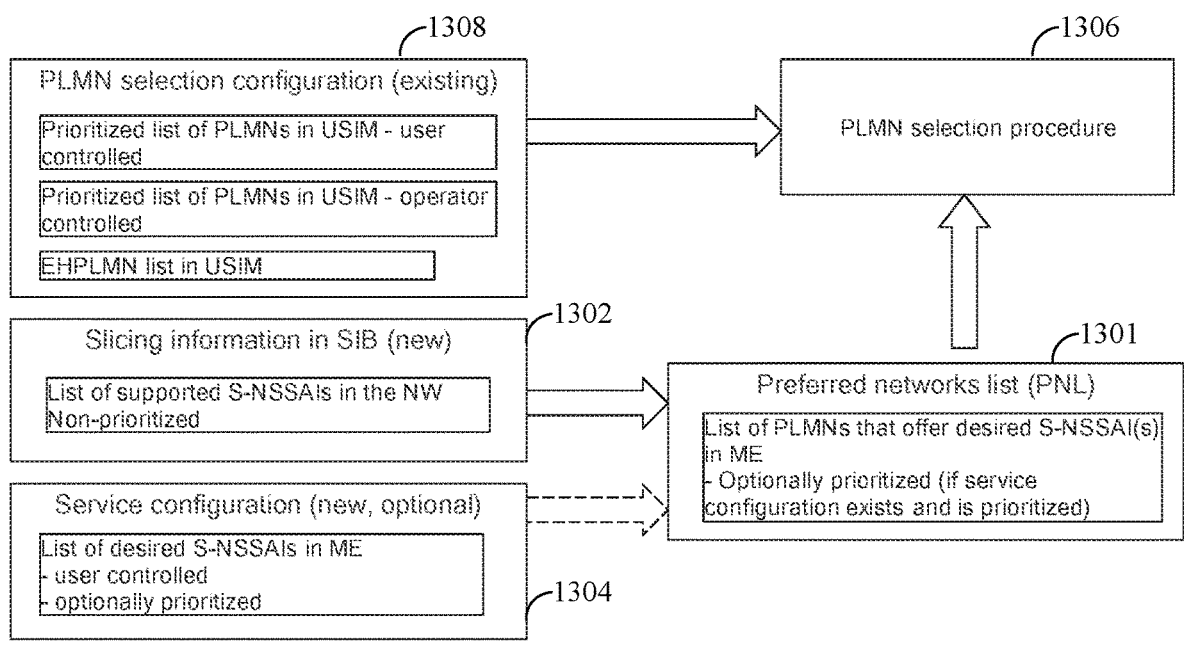
FIG. 13 illustrates an example of slice-aware network selection, in accordance with certain aspects of the present disclosure.

FIG. 13 shows how this broadcast NW slicing information may be used (e.g., in place of the NW slicing information existing/configured for the UE shown in FIG. 9) to derive a PNL 1301. In such cases, SIB could broadcast S-NSSAIs of the slices supported in the network, as illustrated in the network slicing information 1302. In some cases, the SIB could also broadcast supported [S-NSSAI, mapped S-NSSAI] combinations for several other networks (e.g., indicating mapped S-NSSAI is the S-NSSAI in the home network of the UE). In some cases, the SIB could broadcast the information that can be used to derive one or more S-NSSAIs of the slices supported in the network. As illustrated, the UE 120a may derive the PNL 1301 based on the broadcasted network slicing information 1302 as well as service configuration information 1304. In some cases, the UE 120a may derive the PNL 1301 in a similar manner as described above with respect to the PNL 908 illustrated in FIG. 9 (e.g., except that the UE 120a in FIG. 13 may use the broadcasted network slicing information 1302 as opposed to the existing NW information 910). Thereafter, the UE 120a may perform network selection 1306, taking into account PLMN selection configuration information 1308 and the PNL 1301.

Figure 14A:
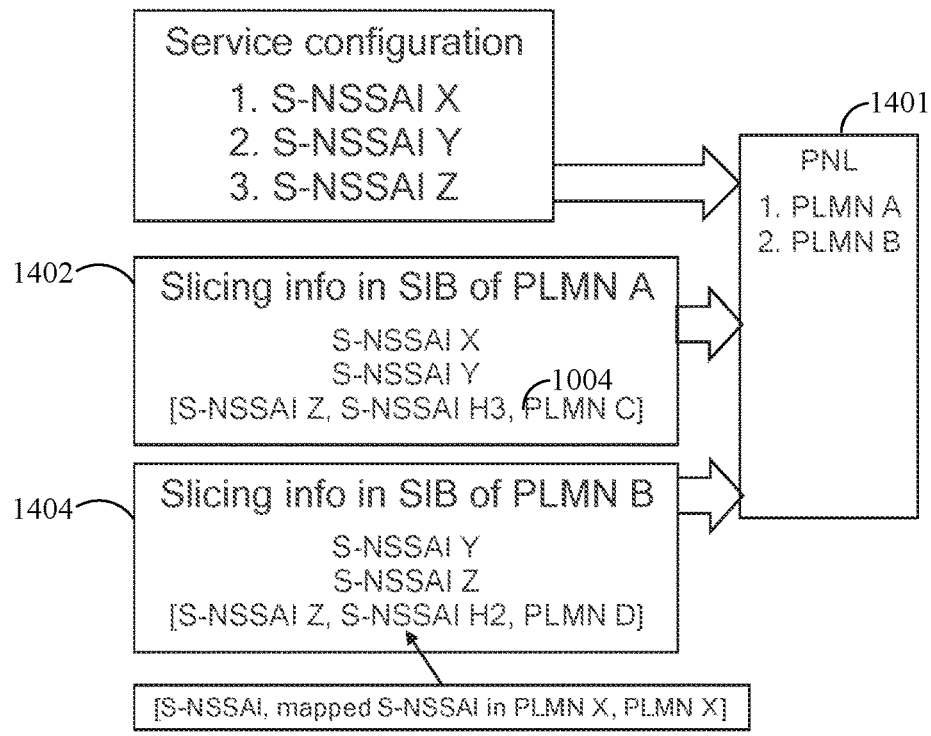
FIGS. 14A-14B illustrate examples of preferred network lists, in accordance with certain aspects of the present disclosure.
Figure 14B:
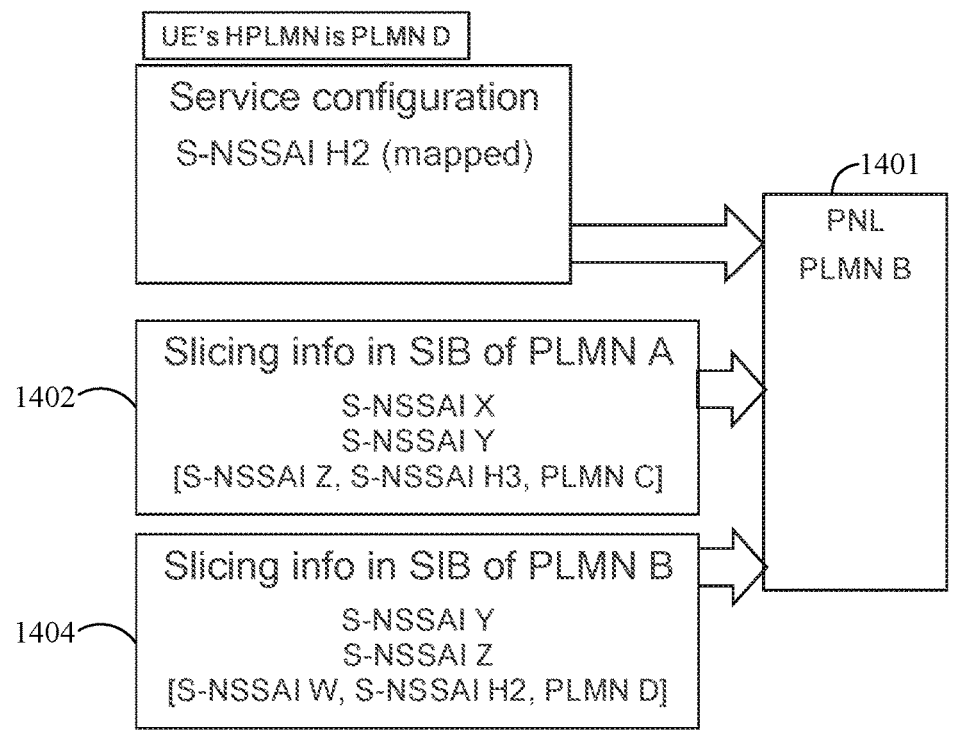

FIGS. 14A-14B illustrate various examples of how a PNL may be derived by the UE 120a from broadcast (SIB) NSSAI information.

In the example shown in FIG. 14A, PLMN A is given highest priority in the PNL 1401, as the SIB NW slicing information 1402 for PLMN A (e.g., received from the network) indicates support for both S-NSSAI X and S-NSSAI Y, while the SIB NW slicing information 1404 for PLMN B indicates support for S-NSSAI Y and S-NSSAI Z. Since this example assumes desired services, in order of priority, of S-NSSAI X, S-NSSAI Y, and S-NSSAI Z, PLMN A is prioritized by the UE 120a in the PNL 1401.

As illustrated in FIG. 14B, based on the in SIB NW slicing information 1402 and SIB NW slicing information 1404, the UE 120a may determine that PLMN B supports a desired service, such as S-NSSAI H2 (e.g., which maps to S-NSSAI W in PLMN B). In such cases, PLMN B is the only PLMN included by the UE 120a in the PNL 141 in this example.

According to certain aspects of the present disclosure, slice-aware considerations may also be taken to trigger certain actions by the UE 120a, such as de-registration. In other words, the techniques may be considered as providing slice-aware PLMN selection triggers.

Figure 15:
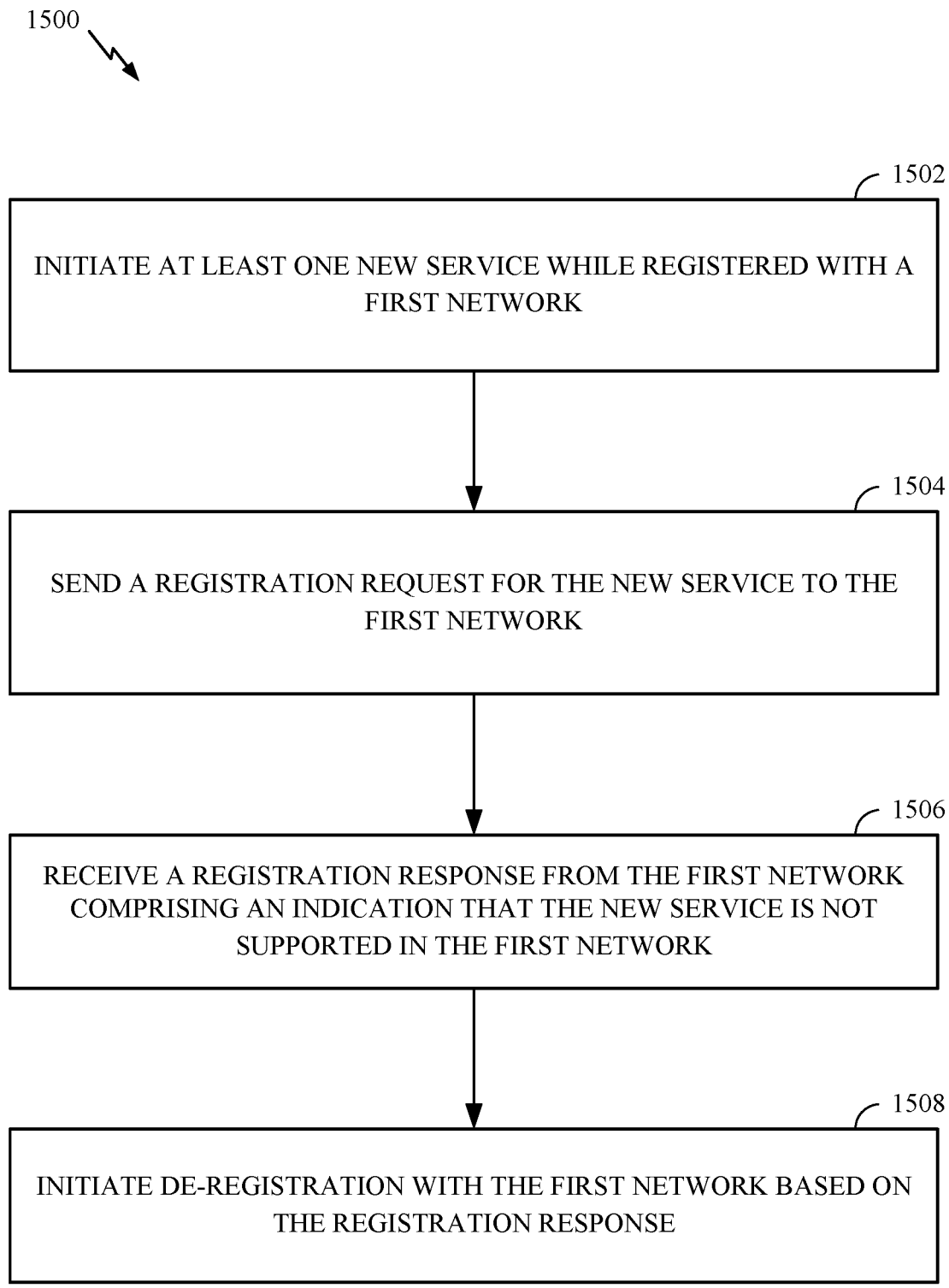
FIG. 15 illustrates example operations for UE-initiated de-registration, in accordance with certain aspects of the present disclosure.

FIG. 15 is a flow diagram illustrating example operations 1500 for wireless communication, in accordance with certain aspects of the present disclosure. The operations 1500 may be performed, for example, by a UE (e.g., such as the UE 120a in the wireless communication network 100) for UE-initiated de-registration. The operations 1500 may be implemented as software components that are executed and run on one or more processors (e.g., controller/processor 280 of FIG. 2). Further, the transmission and reception of signals by the UE in operations 1500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1500 begin, at 1502, by sending a registration request for a new service to a first network.

At 1504, the UE receives a registration response from the first network comprising an indication that the new service is not supported in the first network.

At 1506, the UE initiates de-registration with the first network based on the registration response.

According to certain aspects, in some cases, the UE 120a may initiate de-registration when the network does not support a desired/preferred S-NSSAI(s) and perform PLMN selection based on the PNL, for example to select a PLMN that supports the desired/preferred S-NSSAI(s). This may be considered a form of slice-aware PLMN selection. In some cases, this capability may be captured in standard specifications, for example, explicitly adding this slice-aware case as a trigger for UE-initiated de-registration.

This may be triggered, for example, due to a change in the service configuration (e.g., by a user). As noted above, this may trigger PLMN selection. In some cases, a registration request to change a requested NSSAI may be triggered, for example, if the change of requested NSSAI is an existing registration request (RR) trigger. In some cases, if the network does not provide the desired S-NSSAI in the response, the UE can de-register and perform PLMN selection (which may be slice-aware as described above) based on the PNL, for example, to select a PLMN that supports the desired S-NSSAI.

For example, as noted above, in some cases, the UE 120a may send a registration request for a new/desired service to a first network. The UE 120a may then receive a registration response from the first network (e.g., based on the registration request) that includes an indication that the new service is not supported in the first network. Thereafter, the UE may initiate a de-registration with the first network based on the first network not supporting the new/desired service.

In some cases, the registration request may include a requested NSSAI information element, such as the NSSAI IE illustrated in FIG. 5. Further, in some cases, the requested NSSAI information element may indicate at least one S-NSSAI of a slice that supports the new service.

In some cases, the indication that the new service is not supported in the first network may comprise an allowed NSSAI not containing an S-NSSAI of a slice that supports the new service. In other cases, the indication that the new service is not supported in the first network may comprise a rejected NSSAI containing the S-NSSAI of a slice that supports the new service.

In some cases, the UE 120a may initiating at least one new service while registered with the first network. According to aspects, if the first network does not support the at least one new service, the UE 120a may initiate the re-registration with the first network.

In some cases, in response to receiving the indication that the new service is not supported in the first network or initiating the de-registration with the first network, the UE 120a may search for a new network to register with that supports the new service. For example, in some cases, the UE 120a may perform a search for a second network that supports the new service and, if the search is successful, the UE 120a may send a registration request to the second network to request the new service from the second network.

Example Wireless Communication Devices

Figure 16:
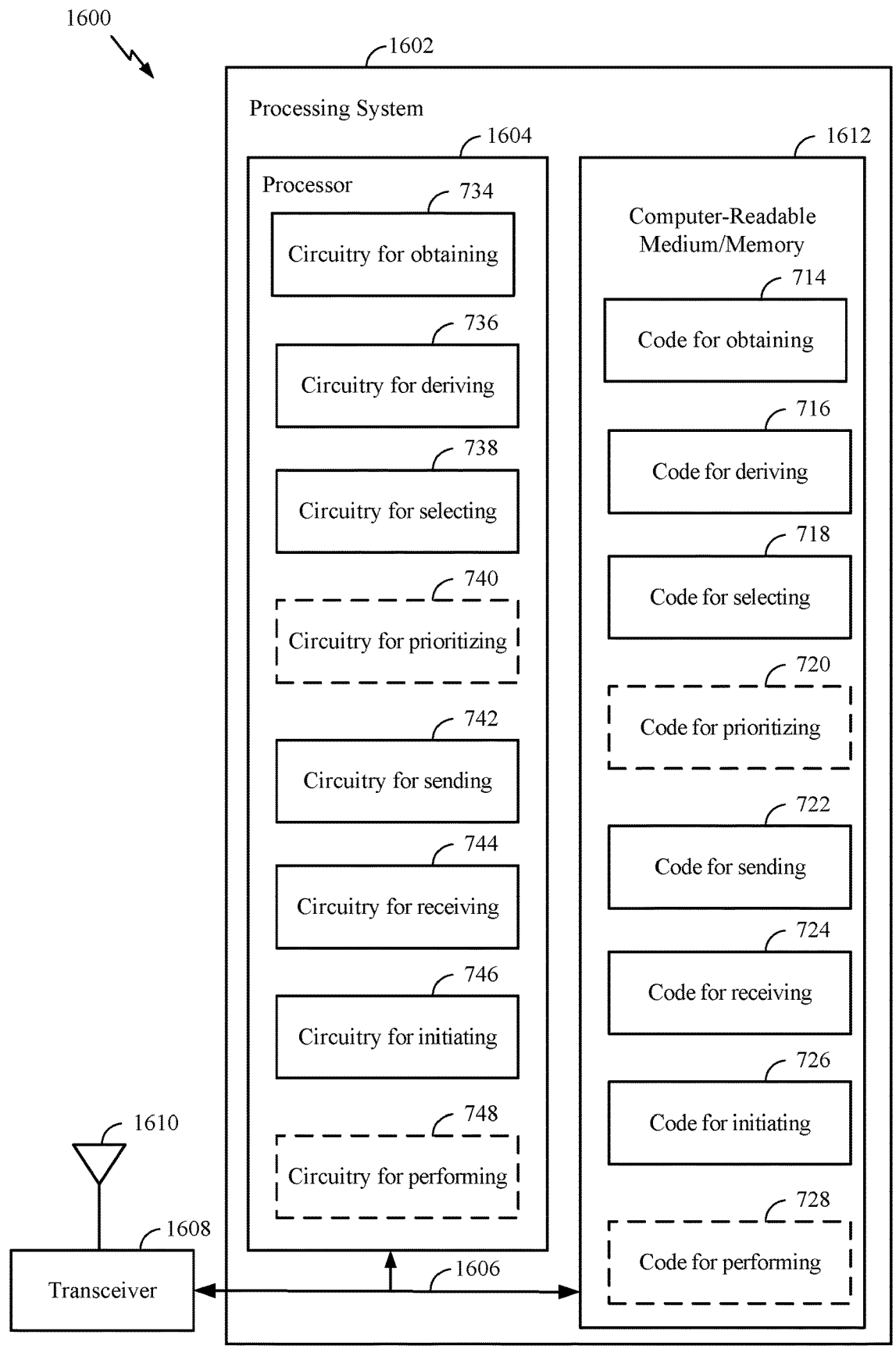
FIG. 16 illustrates an example wireless communications device configured to perform operations for the methods disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in one or more of FIG. 8 or FIG. 15.

Communications device 1600 includes a processing system 1602 coupled to a transceiver 1608 (e.g., a transmitter and/or a receiver). Transceiver 1608 is configured to transmit and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIG. 8 and/or FIG. 15, as well as other operations for performing the various techniques discussed herein for performing slice-aware network selection and/or performing UE-initiated de-registration. In some cases, the processor 1604 can include one or more components of UE 120a with reference to FIG. 2 such as, for example, controller/processor 280, transmit processor 264, receive processor 258, and/or the like. Additionally, in some cases, the computer-readable medium/memory 1612 can include one or more components of UE 120a with reference to FIG. 2 such as, for example, memory 282 and/or the like.

In certain aspects, computer-readable medium/memory 1612 stores code 1614 for obtaining, code 1616 for deriving, code 1618 for selecting, code 1620 for prioritizing, code 1622 for sending, code 1624 for receiving, code 1626 for initiating, and code 1628 for performing.

In some cases, code 1614 for obtaining may include code for obtaining, for one or more networks, network slicing information indicating one or more slice identifiers supported in the one or more networks.

In some cases, code 1616 for deriving may include code for deriving a list of one or more preferred networks based, at least in part, on the network slicing information.

In some cases, code 1618 for selecting may include code for selecting a network to register with from the list of one or more preferred networks.

In some cases, code 1618 for selecting may include code for selecting a last registered PLMN (RPLMN) or equivalent home (EHPLMN), if in the list of preferred PLMNs.

In some cases, code 1618 for selecting may include code for selecting a visited PLMN (VPLMN) if the VPLMN is in the list of preferred PLMNs.

In some cases, code 1620 for prioritizing may include code for prioritizing a list of preferred networks.

In some cases, code 1620 for prioritizing may include code for giving priority to one or more networks with at least one slice that supports a preferred service.

In some cases, code 1620 for prioritizing may include code for giving higher priority to one or more networks with an allowed slice that supports the preferred service over one or more networks with a configured slice that supports the preferred service.

In some cases, code 1622 for sending may include code for sending a registration request for a new service to a first network.

In some cases, code 1624 for receiving may include code for receiving a registration response from the first network comprising an indication that the new service is not supported in the first network.

In some cases, code 1626 for initiating may include code for initiating de-registration with the first network based on the registration response In some cases, code 1626 for initiating may include code for initiating at least one new service while registered with the first network.

In some cases, code 1628 for performing may include code for performing a search for a second network that supports the new service.

In some cases, code 1622 for sending may include code for sending a registration request to the second network to request the new service from the second network.

In certain aspects, processor 1604 has circuitry configured to implement the code stored in the computer-readable medium/memory 1612. For example, processor 1604 includes circuitry 1634 for obtaining, circuitry 1636 for deriving, circuitry 1638 for selecting, circuitry 1640 for prioritizing, circuitry 1642 for sending, circuitry 1644 for receiving, circuitry 1646 for initiating, and circuitry 1648 for performing.

In some cases, circuitry 1634 for obtaining may include circuitry for obtaining, for one or more networks, network slicing information indicating one or more slice identifiers supported in the one or more networks.

In some cases, circuitry 1636 for deriving may include circuitry for deriving a list of one or more preferred networks based, at least in part, on the network slicing information.

In some cases, circuitry 1638 for selecting may include circuitry for selecting a network to register with from the list of one or more preferred networks.

In some cases, circuitry 1638 for selecting may include circuitry for selecting a last registered PLMN (RPLMN) or equivalent home (EHPLMN), if in the list of preferred PLMNs.

In some cases, circuitry 1638 for selecting may include circuitry for selecting a visited PLMN (VPLMN) if the VPLMN is in the list of preferred PLMNs.

In some cases, circuitry 1640 for prioritizing may include circuitry for prioritizing a list of preferred networks.

In some cases, circuitry 1640 for prioritizing may include circuitry for giving priority to one or more networks with at least one slice that supports a preferred service.

In some cases, circuitry 1640 for prioritizing may include circuitry for giving higher priority to one or more networks with an allowed slice that supports the preferred service over one or more networks with a configured slice that supports the preferred service.

In some cases, circuitry 1642 for sending may include circuitry for sending a registration request for a new service to a first network.

In some cases, circuitry 1644 for receiving may include circuitry for receiving a registration response from the first network comprising an indication that the new service is not supported in the first network.

In some cases, circuitry 1646 for initiating may include circuitry for initiating de-registration with the first network based on the registration response In some cases, circuitry 1646 for initiating may include circuitry for initiating at least one new service while registered with the first network.

In some cases, circuitry 1648 for performing may include circuitry for performing a search for a second network that supports the new service.

In some cases, circuitry 1642 for sending may include circuitry for sending a registration request to the second network to request the new service from the second network.

In some cases, the operations illustrated in FIG. 11 and FIG. 15, as well as other operations described herein for performing slice-aware network selection and/or performing UE-initiated de-registration, may be implemented by one or means-plus-function components. For example, in some cases, such operations may be implemented by means for obtaining, means for deriving, means for selecting, means for prioritizing, means for sending, means for receiving, means for initiating, and means for performing.

In some cases, means for sending (or means for transmitting or means for outputting for transmission) includes the transceiver 254 and/or antenna(s) 252 of the UE 120a illustrated in FIG. 2 and/or circuitry 1642 for sending of the communication device 1600 in FIG. 16.

In some cases, means for receiving (or means for obtaining) includes the receiver and/or antenna(s) 252 of the UE 120a illustrated in FIG. 2 and/or circuitry 1634 for receiving of the communication device 1600 in FIG. 16.

In some cases, means for deriving, means for selecting, means for prioritizing, means for initiating, and means for performing, include a processing system, which may include one or more processors, such as the receive processor 258, the transmit processor 4264, the TX MIMO processor 266, and/or the controller/processor 280 of the UE 120a illustrated in FIG. 2 and/or the processing system 1602 of the communication device 1600 in FIG. 16.

Example Clauses

Implementation examples are described in the following numbered clauses:

Clause 1: A method for wireless communications by a user equipment (UE), comprising: obtaining, for one or more networks, network slicing information indicating one or more slice identifiers supported in the one or more networks; deriving a list of one or more preferred networks based, at least in part, on the network slicing information; and selecting a network to register with from the list of one or more preferred networks.

Clause 2: The method of Clause 1, wherein selecting the network to register with from the list of one or more preferred networks comprises selecting a public land mobile network (PLMN) based on: one or more prioritized lists of preferred networks; and one or more lists of slice identifiers supported in a network, for one or more networks.

Clause 3: The method of Clause 2, selection of the PLMN is also based on a list of preferred slice identifiers.

Clause 4: The method of any of Clauses 1-3, wherein: the list of one or more preferred networks comprises a list of public land mobile networks (PLMNs) that offer desired services; and selection of the network to register with is based on a combination of the list of PLMNs that offer the desired services and PLMNs stored on the UE.

Clause 5: The method of any of Clauses 1-3, wherein: the list of one or more preferred networks comprises a list of preferred public land mobile networks (PLMNs) that offer desired services; and selecting the network to register with comprises selecting: a last registered PLMN (RPLMN) if the RPLMN is in the list of preferred PLMNs; or an equivalent home (EHPLMN) if the EHPLMN is in the list of preferred PLMNs.

Clause 6: The method of Clause 5, wherein selecting the network to register with further comprises, if the last RPLMN and the EHPLMN is not in the list of preferred PLMNs, selecting a visited PLMN (VPLMN) if the VPLMN is in the list of preferred PLMNs.

Clause 7: The method of Clause 6, wherein priority is given to a VPLMN from a user-controlled PLMN list over an operator-controlled PLMN list.

Clause 8: The method of claim 6, wherein the VPLMN is selected based on signal quality.

Clause 9: The method of any of Clauses 1-8, wherein the network slicing information comprises at least one of: a configured network slice selection assistance information (NSSAI); or an allowed NSSAI.

Clause 10: The method of any of Clauses 1-9, wherein the network slice information is obtained via broadcast system information.

Clause 11: The method of any of Clauses 1-10, wherein the list of one or more preferred networks is also derived based on a list of preferred services.

Clause 12: The method of Clause 11, wherein the list of preferred services is prioritized.

Clause 13: The method of any of Clauses 11-12, further comprising prioritizing the list of one or more preferred networks.

Clause 14: The method of Clause 13, wherein prioritizing the list of one or more preferred networks comprising giving priority to one or more networks with at least one slice that supports a preferred service.

Clause 15. The method of Clause 14, wherein prioritizing the list of one or more preferred networks comprising giving higher priority to one or more networks with an allowed slice that supports the preferred service over one or more networks with a configured slice that supports the preferred service.

Clause 16: A method for wireless communications by a user equipment (UE), comprising: sending a registration request for a new service to a first network; receiving a registration response from the first network comprising an indication that the new service is not supported in the first network; and initiating de-registration with the first network based on the registration response.

Clause 17: The method of claim 16, further comprising: initiating at least one new service while registered with the first network.

Clause 18: The method of any of Clauses 16-17, further comprising: performing a search for a second network that supports the new service; and if the search is successful, sending a registration request to the second network to request the new service from the second network.

Clause 19: The method of any of Clauses 16-18, wherein the registration request includes a requested network slice selection assistance information (NSSAI) information element.

Clause 20: The method of Clause 19, wherein the requested NSSAI information element indicates at least one single NSSAI (S-NSSAI) of a slice that supports the new service.

Clause 21: The method of any of Clauses 16-20, wherein the indication comprises: an allowed network slice selection assistance information (NSSAI) not containing a single NSSAI (S-NSSAI) of a slice that supports the new service; or a rejected NSSAI containing the S-NSSAI of a slice that supports the new service.

Clause 22: A processing system, comprising: a memory comprising computer-executable instructions; one or more processors configured to execute the computer-executable instructions and cause the processing system to perform a method in accordance with any one of Clauses 1-21.

Clause 23: A processing system, comprising means for performing a method in accordance with any one of Clauses 1-21.

Clause 24: A non-transitory computer-readable medium comprising computer-executable instructions that, when executed by one or more processors of a processing system, cause the processing system to perform a method in accordance with any one of Clauses 1-21.

Clause 25: A computer program product embodied on a computer-readable storage medium comprising code for performing a method in accordance with any one of Clauses 1-26.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 15, as well as other operations disclosed herein for performing the various techniques discussed herein for performing slice-aware network selection and/or performing UE-initiated de-registration.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   obtaining one or more prioritized public land mobile network (PLMN) lists;
   obtaining, for one or more networks, network slicing information indicating one or more slice identifiers supported in the one or more networks;
   deriving, based on the network slicing information, a list of two or more preferred networks that offer desired services for the UE; and
   selecting a network to register with based, at least in part, on the one or more prioritized PLMN lists and the list of preferred networks.

2. The method of claim 1, wherein selecting the network to register with from the list of preferred networks comprises selecting a PLMN based on
   one or more lists of slice identifiers supported in a network, for one or more networks.

3. The method of claim 2, selection of the PLMN is also based on a list of preferred slice identifiers.

4. The method of claim 1, wherein:
   the list of preferred networks comprises a list of PLMNs that offer the desired services; and
   selection of the network to register with is based on a combination of the list of PLMNs that offer the desired services and PLMNs stored on the UE.

5. The method of claim 1, wherein:
   the list of preferred networks comprises a list of preferred PLMNs that offer the desired services; and
   selecting the network to register with comprises selecting:
     a last registered PLMN (RPLMN) if the RPLMN is in the list of preferred PLMNs; or
     an equivalent home (EHPLMN) if the EHPLMN is in the list of preferred PLMNs.

6. The method of claim 5, wherein selecting the network to register with further comprises, if the last RPLMN and the EHPLMN is not in the list of preferred PLMNs, selecting a visited PLMN (VPLMN) if the VPLMN is in the list of preferred PLMNs.

7. The method of claim 6, wherein priority is given to a VPLMN from a user-controlled PLMN list over an operator-controlled PLMN list.

8. The method of claim 6, wherein the VPLMN is selected based on signal quality.

9. The method of claim 1, wherein the network slicing information comprises at least one of:
   a configured network slice selection assistance information (NSSAI); or
   an allowed NSSAI.

10. The method of claim 1, wherein the network slice information is obtained via broadcast system information.

11. The method of claim 1, wherein the list of preferred networks is also derived based on a list of preferred services.

12. The method of claim 11, wherein the list of preferred services is prioritized.

13. The method of claim 11, further comprising prioritizing the list of preferred networks.

14. The method of claim 13, wherein prioritizing the list of preferred networks comprising giving priority to one or more networks with at least one slice that supports a preferred service.

15. The method of claim 14, wherein prioritizing the list of preferred networks comprising giving higher priority to one or more networks with an allowed slice that supports the preferred service over one or more networks with a configured slice that supports the preferred service.

16. An apparatus for wireless communication by a user equipment (UE), comprising:
   one or more processors individually or collectively configured to execute instructions stored on one or more memories and to cause the UE to:
     obtain one or more prioritized public land mobile network (PLMN) lists;
     obtain, for one or more networks, network slicing information indicating one or more slice identifiers supported in the one or more networks;
     derive, based on the network slicing information, a list of two or more preferred networks that offer desired services for the UE; and
     select a network to register with based, at least in part, on the one or more prioritized PLMN lists and the list of preferred networks.

17. The apparatus of claim 16, wherein, in order to select the network to register with from the list of preferred networks, the one or more processors are configured to cause the UE to select a PLMN based on:
   one or more prioritized lists of preferred networks; and
   one or more lists of slice identifiers supported in a network, for one or more networks.

18. The apparatus of claim 17, wherein selection of the PLMN is also based on a list of preferred slice identifiers.

19. The apparatus of claim 16, wherein:
   the list of preferred networks comprises a list of PLMNs that offer the desired services; and
   the one or more processors are configured to cause the UE to select the network to register with based on a combination of the list of PLMNs that offer the desired services and PLMNs stored on the UE.

20. The apparatus of claim 16, wherein:
   the list of preferred networks comprises a list of preferred PLMNs that offer the desired services; and
   selecting the network to register with comprises selecting:
     a last registered PLMN (RPLMN) if the RPLMN is in the list of preferred PLMNs; or
     an equivalent home (EHPLMN) if the EHPLMN is in the list of preferred PLMNs.

21. The apparatus of claim 20, wherein, in order to select the network to register with further, the one or more processors are further configured to cause the UE to:
   if the last RPLMN and the EHPLMN are not in the list of preferred PLMNs, select a visited PLMN (VPLMN) if the VPLMN is in the list of preferred PLMNs.

22. The apparatus of claim 21, wherein priority is given to a VPLMN from a user-controlled PLMN list over an operator-controlled PLMN list.

23. The apparatus of claim 21, wherein the VPLMN is selected based on signal quality.

24. The apparatus of claim 16, wherein the network slicing information comprises at least one of:
   a configured network slice selection assistance information (NSSAI); or
   an allowed NSSAI.

25. The apparatus of claim 16, wherein the network slicing information is obtained via broadcast system information.

26. The apparatus of claim 16, wherein the list of preferred networks is also derived based on a list of preferred services.

27. The apparatus of claim 26, wherein the list of preferred services is prioritized.

28. The apparatus of claim 16, wherein the one or more processors are configured to cause the UE to prioritize the list of preferred networks.

29. The apparatus of claim 28, wherein, in order to prioritize the list of preferred networks, the one or more processors are configured to cause the UE to give priority to one or more networks with at least one slice that supports a preferred service.

30. The apparatus of claim 29, wherein, in order to prioritize the list of preferred networks, the one or more processors are configured to cause the UE to give higher priority to one or more networks with an allowed slice that supports the preferred service over one or more networks with a configured slice that supports the preferred service.

* * * * *